(12) United States Patent
Rosvold

(10) Patent No.: US 11,255,474 B2
(45) Date of Patent: Feb. 22, 2022

(54) TUBULAR JOINT

(71) Applicant: VETCO GRAY SCANDINAVIA AS, Sandvika (NO)

(72) Inventor: Odd Marius Rosvold, Sandvika (NO)

(73) Assignee: VETCO GRAY SCANDINAVIA AS, Sandvika (NO)

( * ) Notice: Subject to any disclaimer, the term of this patent is extended or adjusted under 35 U.S.C. 154(b) by 352 days.

(21) Appl. No.: 15/781,413

(22) PCT Filed: Dec. 7, 2016

(86) PCT No.: PCT/EP2016/080053
§ 371 (c)(1),
(2) Date: Jun. 4, 2018

(87) PCT Pub. No.: WO2017/097826
PCT Pub. Date: Jun. 15, 2017

(65) Prior Publication Data
US 2018/0320805 A1 Nov. 8, 2018

(30) Foreign Application Priority Data

Dec. 8, 2015 (NO) .................................. 20151697

(51) Int. Cl.
*F16L 23/18* (2006.01)
*F16J 15/02* (2006.01)
*F16L 23/04* (2006.01)

(52) U.S. Cl.
CPC ............. *F16L 23/18* (2013.01); *F16J 15/028* (2013.01); *F16L 23/04* (2013.01)

(58) Field of Classification Search
CPC ........... F16L 23/18; F16L 23/04; F16J 15/028
See application file for complete search history.

(56) References Cited

U.S. PATENT DOCUMENTS 3,997,198 A * 12/1976 Linder
4,441,725 A 4/1984 Bailey
(Continued)

FOREIGN PATENT DOCUMENTS

CN 103314244 A 9/2013
CN 103732898 A 4/2014
(Continued)

*Primary Examiner* — Zachary T Dragicevich
(74) *Attorney, Agent, or Firm* — Baker Hughes Patent Org.

(57) ABSTRACT

A tubular joint comprising first and second tubular members, an annular sealing element positioned between the tubular members and a clamping device for clamping the tubular members to each other with an end face of the first tubular member in contact with an end face of the second tubular member. The sealing element comprises an annular metallic body. Two sealing surfaces on the metallic body are designed to mate with tapered sealing surfaces on the tubular members. A first spring-energized polymeric seal member is mounted to the metallic body and configured to be in sealing contact with a radially extending sealing surface on the first tubular member. A second spring-energized polymeric seal member is mounted to the metallic body and configured to be in sealing contact with a radially extending sealing surface on the second tubular member. Seal members are prestressed upon clamping of the tubular members to each other.

8 Claims, 2 Drawing Sheets

(56) References Cited

U.S. PATENT DOCUMENTS

| | | | | |
|---|---|---|---|---|
| 4,470,609 A | * | 9/1984 | Poe | F16L 23/18 |
| 5,316,320 A | | 5/1994 | Breaker | |
| 5,443,581 A | * | 8/1995 | Malone | F16L 23/04 |
| 5,496,074 A | | 3/1996 | Viratelle et al. | |
| 5,564,715 A | | 10/1996 | Wallace | |
| 5,755,287 A | * | 5/1998 | Cain | |
| 5,839,765 A | * | 11/1998 | Carter | F16L 23/18 |
| 5,944,319 A | * | 8/1999 | Kohlman | F16L 23/18 |
| 8,991,621 B2 | | 3/2015 | Harwell et al. | |
| 9,759,355 B2 | | 9/2017 | Daugherty et al. | |
| 2005/0242584 A1 | | 11/2005 | Matzner | |
| 2013/0285369 A1 | * | 10/2013 | Gjerstad | F16L 23/04 |

FOREIGN PATENT DOCUMENTS

| | | |
|---|---|---|
| DE | 3917453 C1 | 11/1990 |
| DE | 19507854 A1 | 9/1995 |
| GB | 2287734 A | 9/1995 |
| KR | 100251870 B1 | 4/2000 |
| WO | 0047925 A1 | 8/2000 |
| WO | 2009121013 A1 | 10/2009 |

* cited by examiner

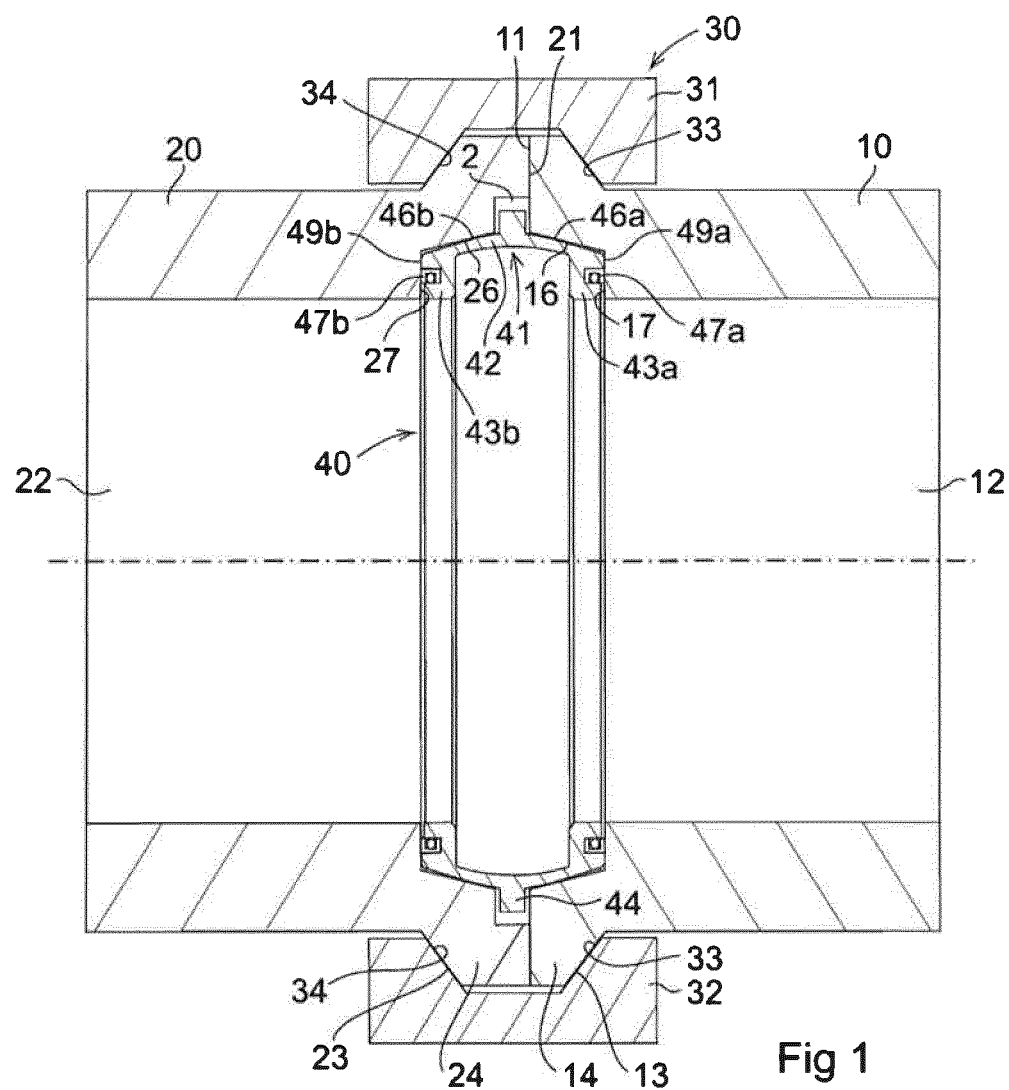
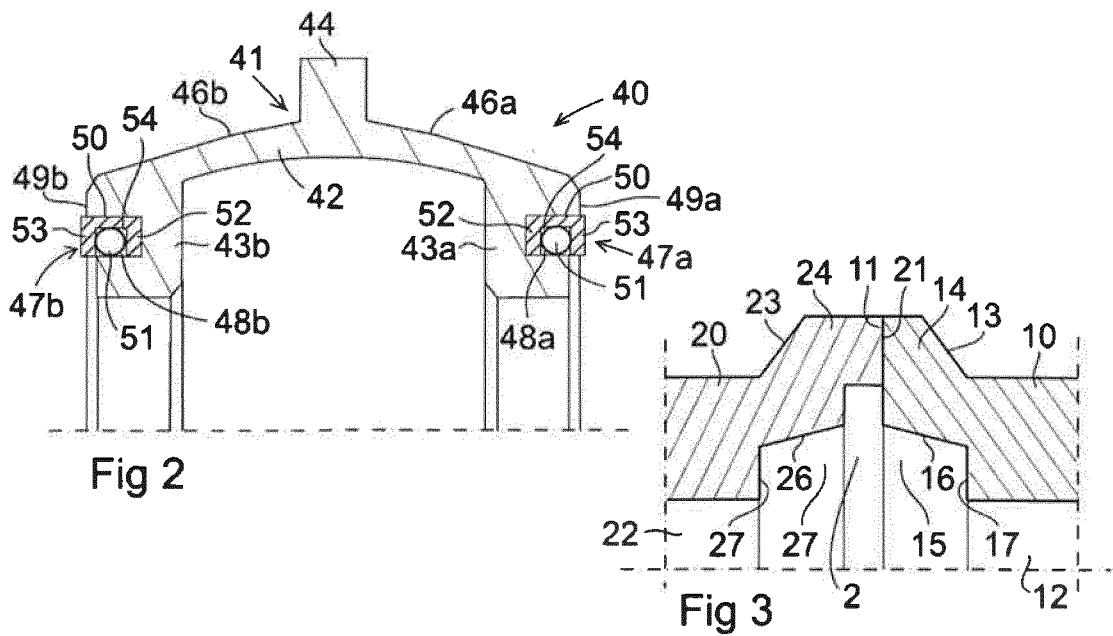
Fig 1
Fig 2
Fig 3

TUBULAR JOINT

FIELD OF THE INVENTION

Embodiments of the present invention relate to a tubular joint.

In this description and the subsequent claims, the term "fluid" refers to a flowing medium in gaseous or liquid form. Consequently, the expression "fluid-tight seal" implies a seal that is liquid-tight as well as gas-tight.

Development within offshore oil and gas exploration in the recent decades has been directed to subsea installations for processing and transport of oil and gas. These subsea installations replace the traditional platforms, where oil and gas were transported up to the platform for further processing and transport. This development of subsea production, processing and transport systems has resulted in an increasing need for tubular joints suitable for subsea use, e.g. for joining fluid conduits belonging to interconnectable processing modules or pipe sections in a fluid-tight manner. It has been realized that seals based on corrosion resistant metallic materials are suitable for use in subsea applications. One known type of tubular joint is provided with a metallic seal ring positioned between tapered inner sealing surfaces of two adjacent tubular members for sealing therebetween. Such a sealing arrangement is very effective for sealing against internal fluid pressure within the tubular members.

A tubular joint for subsea use may be provided with a double barrier seal in order to achieve additional reliability of the joint, both in an environmental context and in order to improve production stability. A tubular joint provided with a double barrier seal is for instance previously known from WO 2012/038799 A1. The tubular joint disclosed in WO 2012/038799 A1 comprises a metallic seal ring having a first outer sealing surface designed to mate with a tapered inner sealing surface of a first tubular member and a second outer sealing surface designed to mate with a tapered inner sealing surface of a second tubular member to form a primary seal upon clamping of the tubular members to each other, wherein a secondary seal is formed by a first annular seal member of elastomeric material interposed between the seal ring and the first tubular member and a second annular seal member of elastomeric material interposed between the seal ring and the second tubular member. If the tapered sealing surface of one of the tubular members is damaged and no longer capable of forming a fluid-tight seal with the corresponding sealing surface of the metallic seal ring, the sealing integrity may be maintained under the effect of the secondary seal formed by the elastomeric annular seal members.

In a tubular joint of the above-mentioned type, the sealing integrity may be lost if the opposite end faces of the two tubular members are slightly separated from each other in a situation when the tubular joint is subjected to high bending load.

SUMMARY OF THE INVENTION

An object of embodiments of the present invention is to provide a solution to the above-mentioned problem.

According to embodiments of the invention, this object is achieved by a tubular joint having the features defined in claim 1.

The tubular joint of an embodiment of the present invention comprises:

a first tubular member and a second tubular member, the first tubular member having an end face configured to face a corresponding end face of the second tubular member;

a clamping device for clamping the tubular members to each other with the end face of the first tubular member in contact with the end face of the second tubular member; and an annular sealing element to be received in an annular groove formed by a first annular recess in the end face of the first tubular member and an opposite second annular recess in the end face of the second tubular member, wherein the sealing element comprises an annular metallic body which has a first outer sealing surface designed to mate with a first tapered sealing surface provided in said first annular recess and a second outer sealing surface designed to mate with a second tapered sealing surface provided in said second annular recess upon clamping of the tubular members to each other, wherein the tubular joint is characterized in:

that the sealing element comprises an annular first spring-energized polymeric seal member mounted to the metallic body and configured to be in sealing contact with a first radially extending sealing surface provided in said first annular recess radially inwardly of the first tapered sealing surface when the tubular members are clamped to each other;

that the sealing element comprises an annular second spring-energized polymeric seal member mounted to the metallic body and configured to be in sealing contact with a second radially extending sealing surface provided in said second annular recess radially inwardly of the second tapered sealing surface when the tubular members are clamped to each other; and that the spring-energized polymeric seal members are configured to be prestressed upon clamping of the tubular members to each other.

The outer sealing surfaces on the metallic body and the associated tapered sealing surfaces on the tubular members form a primary seal for the internal and external fluid pressure of the tubular joint, whereas the spring-energized polymeric seal members and the associated radially extending sealing surfaces on the tubular members form a secondary seal for the internal and external fluid pressure of the tubular joint. Owing to the flexibility and the prestressing of the spring-energized polymeric seal members, the spring-energized polymeric seal members will be capable of maintaining sealing integrity, i.e. capable of remaining in fluid-tight contact with the associated radially extending sealing surfaces on the tubular members, in a situation when the opposite end faces of the two tubular members are slightly separated from each other.

One embodiment of the invention is characterized in:

that the metallic body has a central base part, a flexible first flange and a flexible second flange, wherein the first and second flanges are located opposite each other and connected to the base part at opposite ends thereof and wherein said first and second outer sealing surfaces of the metallic body are provided on the base part;

that first spring-energized polymeric seal member is mounted to the first flange of the metallic body;

that second spring-energized polymeric seal member is mounted to the second flange of the metallic body; and that the flanges of the metallic body are configured to be prestressed upon clamping of the tubular members to each other.

The flexibility and the prestressing of the flanges of the metallic body will improve the ability of the spring-energized polymeric seal members to maintain sealing integrity in a situation when the opposite end faces of the two tubular members are slightly separated from each other.

Another embodiment of the invention is characterized in:
that the first flange of the metallic body comprises a first contact surface configured to be pressed against the first radially extending sealing surface upon clamping of the tubular members to each other;
that the second flange of the metallic body comprises a second contact surface which is located opposite said first contact surface and configured to be pressed against the second radially extending sealing surface upon clamping of the tubular members to each other;
that the first spring-energized polymeric seal member comprises an annular polymeric body which is configured to project beyond said first contact surface when the sealing element is in an unloaded state; and
that the second spring-energized polymeric seal member comprises an annular polymeric body which is configured to project beyond said second contact surface when the sealing element is in an unloaded state.

Hereby, it is ensured that the spring-energized polymeric seal members will be prestressed when the flanges of the metallic body are prestressed by being clamped between the end faces of the tubular members upon clamping of the tubular members to each other.

Further advantages of the tubular joint according to embodiments of the present invention will appear from the dependent claims and the following description.

BRIEF DESCRIPTION OF THE DRAWINGS

With reference to the appended drawings, a specific description of embodiments of the invention cited as examples follows below. In the drawings:

FIG. 1 is a schematic illustration of a first embodiment of a tubular joint, as seen in a longitudinal section, FIG. 2 is a schematic illustration of a part of a sealing element included in the tubular joint of FIG. 1, as seen in a longitudinal section, FIG. 3 is a schematic illustration of a part of two tubular members included in the tubular joint of FIG. 1, as seen in a longitudinal section.

DETAILED DESCRIPTION

Figure 4:
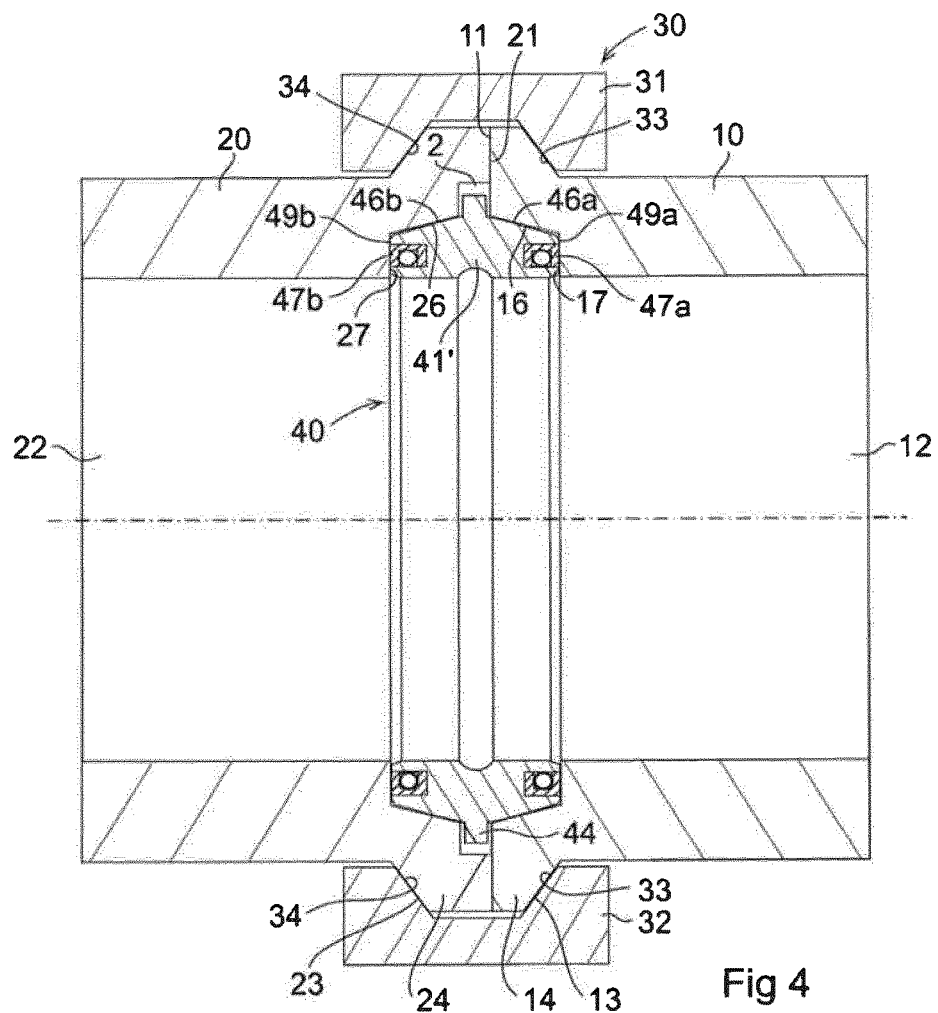
FIG. 4 is a schematic illustration of a second embodiment of a tubular joint, as seen in a longitudinal section.

Two possible embodiments of a tubular joint 1 according to the present invention are illustrated in FIGS. 1 and 4. The tubular joint 1 comprises a first tubular member 10 and a second tubular member 20, which are to be connected to each other. The tubular members 10, 20 are of metallic material. At its outer end, the first tubular member 10 has an end face 11 which is configured to face a corresponding end face 21 provided at the outer end of the second tubular member 20. Furthermore, each tubular member 10, 20 has an internal through bore 12, 22 which extends axially through the tubular member. The first tubular member 10 may be welded to an end portion of a first fluid conduit and the second tubular member 20 may be welded to an end portion of a second fluid conduit. Alternatively, one of the tubular members 10, 20 may have a blind or closed bore instead of a through bore.

Furthermore, the tubular joint 1 comprises a clamping device 30 of any suitable type for clamping the first tubular member 10 to the second tubular member 20 with the end face 11 of the first tubular member in contact with the end face 21 of the second tubular member and with the through bore 12 of the first tubular member aligned with and in fluid communication with the through bore 22 of the second tubular member. In the illustrated example, two clamping members 31, 32 of the clamping device 30 are shown, each being provided with a first inclined inner guide surface 33 designed for engagement with a corresponding inclined outer guide surface 13 provided on a radially projecting flange 14 at the outer end of the first tubular member 10 and a second inclined inner guide surface 34 designed for engagement with a corresponding inclined outer guide surface 23 provided on a radially projecting flange 24 at the outer end of the second tubular member 20. The clamping members 31, 32 are arranged on opposite sides of the tubular members 10, 20 and pressed towards each other in the radial direction so as to thereby force the tubular members 10, 20 towards each other in the axial direction under the effect of the inclined guide surfaces 33, 34, 13, 23. The number of clamping members can be two or more according to each specific use.

The tubular joint 1 also comprises an annular sealing element 40, which is positioned between the tubular members 10, 20. The sealing element 40 is received in an annular groove 2 formed by a first annular recess 15 (see FIG. 3) in the end face 11 of the first tubular member 10 and an opposite second annular recess 25 in the end face 21 of the second tubular member 20. The sealing element 40 comprises an annular metallic body 41, 41' which has a first outer sealing surface 46a designed to mate with a first tapered sealing surface 16 on the first tubular member 10 and a second outer sealing surface 46b designed to mate with a second tapered sealing surface 26 on the second tubular member 20 upon clamping of the tubular members 10, 20 to each other. The first tapered sealing surface 16 is provided in the first annular recess 15 and the second tapered sealing surface 26 is provided in the second annular recess 25. The tapered sealing surface 16, 26 of the respective tubular member 10, 20 is conically shaped.

An annular first spring-energized seal member 47a is mounted to the metallic body 41, 41' on a first side thereof and configured to be in sealing contact with a first radially extending sealing surface 17 on the first tubular member 10 when the tubular members 10, 20 are clamped to each other. The seal member 47a is made in a polymeric material in this embodiment. An corresponding annular second spring-energized seal member 47b is mounted to the metallic body 41, 41' on an opposite second side thereof and configured to be in sealing contact with a second radially extending sealing surface 27 on the second tubular member 20 when the tubular members 10, 20 are clamped to each other. Also this seal member 47b is made in a polymeric material.

However, as can be seen from a following embodiment, the seal members can be made in any materials having some degree of flexibility. In the shown embodiments, the seal members are made in polymeric or metallic materials.

Said first radially extending sealing surface 17 is provided in the first annular recess 15 radially inwardly of the first tapered sealing surface 16, and said second radially extending sealing surface 27 is provided in the second annular recess 25 radially inwardly of the second tapered sealing surface 26. The spring-energized polymeric seal members 47a, 47b are configured to be prestressed upon clamping of the tubular members 10, 20 to each other. This prestressing is achieved in that the metallic body 41 is clamped between the radially extending sealing surfaces 17, 27 of the tubular members 10, 20 with the first spring-energized polymeric seal member 47a in contact with the first radially extending sealing surface 17, and with the second spring-energized polymeric seal member 47b in contact with the second radially extending sealing surface 27.

In the embodiment illustrated in FIGS. 1 and 2, the metallic body 41 of the sealing element 40 has a central base part 42, a flexible first flange 43a and a flexible second flange 43b. The first and second flanges 43a, 43b are located opposite each other and connected to the base part 42 at opposite ends thereof. The first and second flanges 43a, 43b extend radially inwards from the base part 42, i.e. towards the center axis of the metallic body 41. The first and second outer sealing surfaces 46a, 46b of the metallic body 41 are provided on the base part 42. In the illustrated example, the base part 42 is provided with an annular projection 44 on its outside between the first outer sealing surface 46a and the second outer sealing surface 46b. The first spring-energized polymeric seal member 47a is mounted to the first flange 43a of the metallic body 41 and the second spring-energized polymeric seal member 47b is mounted to the second flange 43b of the metallic body 41. The spring-energized polymeric seal members 47a, 47b and the flanges 43a, 43b of the metallic body 41 are configured to be prestressed upon clamping of the tubular members 10, 20 to each other. This prestressing is achieved in that the metallic body 41 is clamped between the radially extending sealing surfaces 17, 27 of the tubular members 10, 20 with the first flange 43a of the metallic body 41 and the first spring-energized polymeric seal member 47a in contact with the first radially extending sealing surface 17, and with the second flange 43b of the metallic body 41 and the second spring-energized polymeric seal member 47b in contact with the second radially extending sealing surface 27.

In the embodiment illustrated in FIGS. 1 and 2, the first spring-energized polymeric seal member 47a is mounted in an annular recess 48a provided in the first flange 43a of the metallic body 41, and the second spring-energized polymeric seal member 47b is mounted in an annular recess 48b provided in the second flange 43b of the metallic body 41.

In the illustrated embodiments, each spring-energized polymeric seal member 47a, 47b comprises an annular polymeric body 50 and an annular spring 51. The annular spring 51 may be a metallic spring or a rubber spring. In the illustrated example, the polymeric body 50 comprises an inner sealing lip 52 and an opposite outer sealing lip 53, wherein the annular spring 51 is disposed in a channel 54 provided in the polymeric body 50 between the inner and outer sealing lips 52, 53. The annular spring 51 is compressed when the outer sealing lip 53 is pressed inwards towards the inner sealing lip 52. The spring-energized polymeric seal members 47a, 47b may of course also have any other suitable design.

The first flange 43a of the metallic body 41 comprises a first contact surface 49a configured to be pressed against the first radially extending sealing surface 17 upon clamping of the tubular members 10, 20 to each other. The second flange 43b of the metallic body 41 comprises a second contact surface 49b which is located opposite said first contact surface 49a and configured to be pressed against the second radially extending sealing surface 27 upon clamping of the tubular members 10, 20 to each other. The polymeric body 50 of the first spring-energized polymeric seal member 47a is configured to project beyond said first contact surface 49a when the sealing element 40 is in an unloaded state, as illustrated in FIG. 2. In the same manner, the polymeric body 50 of the second spring-energized polymeric seal member 47b is configured to project beyond said second contact surface 49b when the sealing element 40 is in the unloaded state.

When the tubular members 10, 20 are clamped to each other, the tapered sealing surface 16 of the first tubular member 10 is pressed against the first outer sealing surface 46a of the metallic body 41 and the tapered sealing surface 26 of the second tubular member 20 is pressed against the second outer sealing surface 46b of the metallic body 41, so as to thereby form a fluid-tight metal-to-metal seal between the sealing element 40 and the tubular members 10, 20. This metal-to-metal seal constitutes a primary seal for the internal fluid pressure of the tubular joint 1.

Furthermore, when the tubular members 10, 20 are clamped to each other, the radially extending sealing surface 17 of the first tubular member 10 is pressed against the contact surface 49a on the first flange 43a of the metallic body 41 and against the outer edge of the first spring-energized polymeric seal member 47a, and the radially extending sealing surface 27 of the second tubular member 20 is pressed against the contact surface 49b on the second flange 43b of the metallic body 41 and against the outer edge of the second spring-energized polymeric seal member 47b. The spring-energized polymeric seal members 47a, 47b and the flanges 43a, 43b of the metallic body 41 are thereby prestressed. Thus, the spring-energized polymeric seal members 47a, 47b will come into sealing contact with the radially extending sealing surfaces 17, 27 of the tubular members 10, 20, so as to thereby form a fluid-tight polymer-to-metal seal between the sealing element 40 and the tubular members 10, 20. This polymer-to-metal seal constitutes a secondary seal for the internal fluid pressure of the tubular joint 1, wherein this secondary seal is provided radially inwardly of the above-mentioned primary seal.

Figure 5:
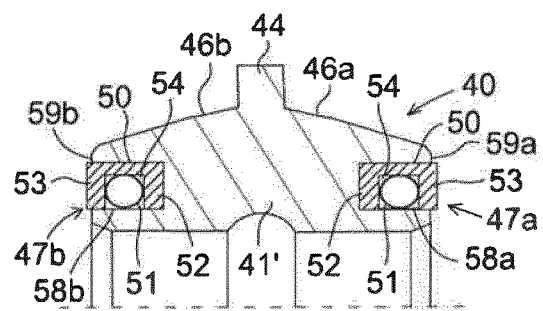
FIG. 5 is a schematic illustration of a part of a sealing element included in the tubular joint of FIG. 4, as seen in a longitudinal section.

In the embodiment illustrated in FIGS. 4 and 5, the metallic body 41' of the sealing element 40 is more compact without a central cavity in the cross section. In this case, the first spring-energized polymeric seal member 47a is mounted in an annular recess 58a provided in a first lateral surface 59a of the metallic body 41', and the second spring-energized polymeric seal member 47b is mounted in an annular recess 58b provided in a second lateral surface 59b of the metallic body 41' opposite said first lateral surface 59a.

The polymeric body 50 of the first spring-energized polymeric seal member 47a is configured to project beyond said first lateral surface 59a when the sealing element 40 is in an unloaded state, as illustrated in FIG. 5. In the same manner, the polymeric body 50 of the second spring-energized polymeric seal member 47b is configured to project beyond said second lateral surface 59b when the sealing element 40 is in the unloaded state.

When the tubular members 10, 20 are clamped to each other, the tapered sealing surface 16 of the first tubular member 10 is pressed against the first outer sealing surface 46a of the metallic body 41' and the tapered sealing surface 26 of the second tubular member 20 is pressed against the second outer sealing surface 46b of the metallic body 41', so as to thereby form a fluid-tight metal-to-metal seal between the sealing element 40 and the tubular members 10, 20. This metal-to-metal seal constitutes a primary seal for the internal fluid pressure of the tubular joint 1. Furthermore, when the tubular members 10, 20 are clamped to each other, the radially extending sealing surface 17 of the first tubular member 10 is pressed against the outer edge of the first spring-energized polymeric seal member 47a, and the radially extending sealing surface 27 of the second tubular member 20 is pressed against the outer edge of the second spring-energized polymeric seal member 47b. The spring-energized polymeric seal members 47a, 47b are thereby prestressed. Thus, the spring-energized polymeric seal members 47a, 47b will come into sealing contact with the radially extending sealing surfaces 17, 27 of the tubular members 10, 20, so as to thereby form a fluid-tight polymer-to-metal seal between the sealing element 40 and the tubular members 10, 20. This polymer-to-metal seal constitutes a secondary seal for the internal fluid pressure of the tubular joint 1, wherein this secondary seal is provided radially inwardly of the above-mentioned primary seal.

Figure 6:
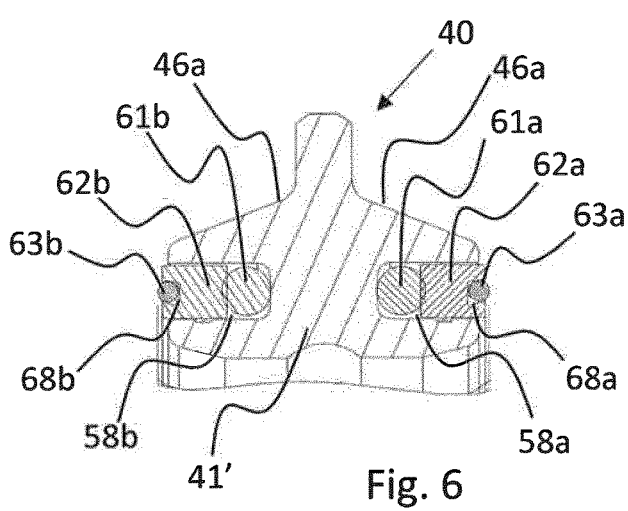
FIG. 6 is a schematic illustration of a third embodiment of the part of a sealing element included in the tubular joint of FIG. 4, as seen in longitudinal section.

FIG. 6 shows a further embodiment of the energized seal members arranged in the annular recesses 58a and 58b. In this case, first seal members 61a and 61b are arranged in the annular recesses 58a and 58b. In this embodiment the first seal members are made in a polymeric material. Thereafter, second seal members 62a and 62b are arranged in the same annular recesses, thereby locking the first seal members in the annular recesses. The second seal members are in this embodiment made in a metallic material. The second seal members 62a and 62b are provided with annular grooves 68a and 68b into which third seal members 63a and 63b are provided. In this embodiment the third seal members are made in a polymeric material.

The second seal members 62a, 62b will protrude from the annular recesses 58a, 58b in unstressed condition, i.e. before being mounted in the coupling. When the sealing element is pressed between the tubular members, the third seal elements 63a, 63b are pressed into the annular grooves 68a, 68b in the second seal members 62a, 62b. The second seal members 62a, 62b are pressed onto the first seal members 61a, 61b, thereby forming a multiple bias between the seal members 61a, 61b, 62a, 62b, 63a, 63b and the abutting sealing surfaces 17, 27.

The primary and secondary seals constituted by the above-mentioned metal-to-metal seals and polymer-to-metal seals are also designed to seal against external fluid pressure.

The invention is of course not in any way restricted to the embodiments described above. On the contrary, many possibilities to modifications thereof will be apparent to a person with ordinary skill in the art without departing from the basic idea of the invention such as defined in the appended claims.

The written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A tubular joint comprising:
   a first tubular member and a second tubular member, the first tubular member having an end face configured to face a corresponding end face of the second tubular member;
   a clamping device to clamp the tubular members to each other with the end face of the first tubular member in contact with the end face of the second tubular member; and
   an annular sealing element to be received in an annular groove formed by a first annular recess in the end face of the first tubular member and an opposite second annular recess in the end face of the second tubular member, the annular sealing element comprising:
      an annular metallic body which has a first outer sealing surface configured to mate with a first tapered sealing surface provided in said first annular recess and a second outer sealing surface designed to mate with a second tapered sealing surface provided in said second annular recess upon clamping of the tubular members to each other;
      an annular first spring-energized seal member mounted to the metallic body and configured to be in sealing contact with a first radially extending sealing surface provided in said first annular recess radially inwardly of the first tapered sealing surface when the tubular members are clamped to each other; and
      an annular second spring-energized seal member mounted to the metallic body and configured to be in sealing contact with a second radially extending sealing surface provided in said second annular recess radially inwardly of the second tapered sealing surface when the tubular members are clamped to each other, wherein
      the first and second spring-energized seal members are prestressed when the tubular members are clamped to each other.

2. A tubular joint according to claim 1, wherein the first and second spring-energized seal members are made of a polymeric or metallic material.

3. A tubular joint according to claim 1, wherein:
   the metallic body has a central base part, a flexible first flange and a flexible second flange, wherein the first and second flanges are located opposite each other and connected to the base part at opposite ends thereof and said first and second outer sealing surfaces of the metallic body are provided on the base part;
   the first spring-energized seal member is a first spring-energized polymeric seal member mounted to the first flange of the metallic body;
   the second spring-energized seal is a second spring-energized polymeric seal member mounted to the second flange of the metallic body; and
   the first and second flanges of the metallic body are configured to be prestressed upon clamping of the tubular members to each other.

4. A tubular joint according to claim 3, wherein the first spring-energized polymeric seal member is mounted in an annular recess provided in the first flange of the metallic body.

5. A tubular joint according to claim 3, wherein the second spring-energized polymeric seal member is mounted in an annular recess provided in the second flange of the metallic body.

6. A tubular joint according to claim 3, wherein:
the first flange of the metallic body comprises a first contact surface configured to be pressed against the first radially extending sealing surface upon clamping of the tubular members to each other;
the second flange of the metallic body comprises a second contact surface which is located opposite said first contact surface and configured to be pressed against the second radially extending sealing surface upon clamping of the tubular members to each other;
the first spring-energized polymeric seal member comprises an annular polymeric body which is configured to project beyond said first contact surface when the sealing element is in an unloaded state; and
the second spring-energized polymeric seal member comprises an annular polymeric body which is configured to project beyond said second contact surface when the sealing element is in an unloaded state.

7. A tubular joint according to claim 1, wherein each spring-energized polymeric seal member comprises an annular polymeric body and an annular spring, wherein the polymeric body comprises an inner sealing lip and an opposite opposing outer sealing lip, and wherein the annular spring is disposed in a channel provided in the polymeric body between the inner and outer sealing lips.

8. A tubular joint according to claim 7, wherein the annular spring is a metallic spring or a rubber spring.

* * * * *